(12) United States Patent
Koike et al.

(10) Patent No.: US 11,671,654 B2
(45) Date of Patent: Jun. 6, 2023

(54) VIDEO QUALITY ESTIMATION APPARATUS, VIDEO QUALITY ESTIMATION METHOD AND PROGRAM

(71) Applicant: NIPPON TELEGRAPH AND TELEPHONE CORPORATION, Tokyo (JP)

(72) Inventors: Masanori Koike, Musashino (JP); Yuichiro Urata, Musashino (JP); Kazuhisa Yamagishi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/310,691

(22) PCT Filed: Feb. 26, 2020

(86) PCT No.: PCT/JP2020/007628
§ 371 (c)(1),
(2) Date: Aug. 18, 2021

(87) PCT Pub. No.: WO2020/179563
PCT Pub. Date: Sep. 10, 2020

(65) Prior Publication Data
US 2022/0132205 A1 Apr. 28, 2022

(30) Foreign Application Priority Data
Mar. 1, 2019 (JP) .............................. JP2019-037769

(51) Int. Cl.
*H04N 21/44* (2011.01)
*H04N 21/81* (2011.01)

(52) U.S. Cl.
CPC ..... *H04N 21/44008* (2013.01); *H04N 21/816* (2013.01)

(58) Field of Classification Search
CPC .......... H04N 21/2341; H04N 21/2343; H04N 21/2625; H04N 21/8456; H04N 21/4728
(Continued)

(56) References Cited

U.S. PATENT DOCUMENTS

2019/0387224 A1* 12/2019 Phillips ................ H04N 19/115

FOREIGN PATENT DOCUMENTS

| JP | 2007-251968 | 9/2007 |
| JP | 2009-260940 | 11/2009 |
| JP | 2014-527778 | 10/2014 |

OTHER PUBLICATIONS

"Objective perceptual multimedia video quality measurement of HDTV for digital cable television in the presence of a full reference", Recommendation ITU-T J.341, read on Mar. 2016.
(Continued)

*Primary Examiner* — Jared Walker
(74) *Attorney, Agent, or Firm* — IPUSA, PLLC (57) ABSTRACT

A video quality estimation device for estimating a quality experienced by a user in a tile-based video distribution service in which a video is divided into tiles and distributed includes a video quality parameter extraction unit that extracts a first parameter representing a quality of a first tile and a second parameter representing qualities of one or more second tiles, from a received tile-based video; and a video quality estimation unit that estimates a quality of the tile-based video by using the first parameter and the second parameter.

6 Claims, 4 Drawing Sheets

(58) Field of Classification Search
USPC .......................................................... 348/180
See application file for complete search history.

(56) References Cited

OTHER PUBLICATIONS

"Parametric non-intrusive bitstream assessment of video media streaming quality Amendment 1", Recommendation ITU-T P.1202 Amendment 1, read on Mar. 2013.
"Parametric non-intrusive assessment of audiovisual media streaming quality", Recommendation ITU-T P.1201, read on Oct. 2012.
"Parametric bitstream-based quality assessment of progressive download and adaptive audiovisual streaming services over reliable transport", Recommendation ITU-T P.1203, read on Oct. 2017.
Yaj Sodagar, "The MPEG-DASH Standard for Multimedia Streaming Over the Internet", IEEE MultiMedia, vol. 18, No. 4, 2011, pp. 62-67.
Jean Le Feuvre and Cyril Concolato, "Tiled-based Adaptive Streaming using MPEG-DASH", MMSys '16 Proceedings of the 7th International Conference on Multimedia Systems, read on May 10, 2016.

\* cited by examiner

VIDEO QUALITY ESTIMATION APPARATUS, VIDEO QUALITY ESTIMATION METHOD AND PROGRAM

TECHNICAL FIELD

The present invention relates to a video quality estimation device, a video quality estimation method, and a program. In particular, the present invention relates to a video quality estimation device, a video quality estimation method, and a program for estimating a quality value of a video (video quality value) experienced by a user in a tile-based video distribution service that divides the video into tiles and distributes the video.

BACKGROUND ART

In recent years, with the development of virtual reality (VR) technology, there are increasing opportunities for users to view 360-degree VR videos. Along with this, VR video distribution services are increasing, and accordingly, there are also increasing opportunities for users to view VR videos using a head-mounted display (HMD), a conventional stationary display, or the like. When a user views a VR video, for example, the user who wears an HMD can change the direction of the line of sight by turning his/her head or moving his/her body, or the user who uses a conventional stationary display can change the viewing direction of the video by operating a mouse or the like.

Generally, in a video distribution service, the quality of a video that a user perceives is strongly influenced by parameters (bit rate, resolution, frame rate, etc.) related to the video quality. The quality evaluation of two-dimensional video has been studied for a long time. For example, NPL 1 to NPL 4 disclose objective quality assessment techniques for estimating video quality from video signals, video bit stream, packet headers, metadata, and the like when an evaluator views a two-dimensional video.

A distribution method proposed for VR video is different from that for 2D video because it is necessary to consider a distribution technique peculiar to VR in terms of estimating the quality before distribution. In VR video distribution, the video to be displayed on a display is only a part of a full 360-degree video. Accordingly, instead of a method for distributing the entire video with uniform image quality as in the conventional video distribution services, a technique called tile-based distribution has been proposed in which video to be displayed on a display in the viewing direction of the user is distributed with high image quality, while the other video not to be displayed on the display is distributed with low image quality or not distributed, thereby reducing distribution costs. An example of tile-based distribution is a technique for using the distribution method called MPEG-DASH described in NPL 5 to perform the tile dividing of VR video as described in NPL 6, encoding each tile with different image quality, and distributing the resulting video.

CITATION LIST

Non Patent Literature

[NPL 1] Objective perceptual multimedia video quality measurement of HDTV for digital cable television in the presence of a full reference, Recommendation ITU-T J.341, 2016

[NPL 2] Parametric non-intrusive bitstream assessment of video media streaming quality, Recommendation ITU-T P.1202, 2012

[NPL 3] Parametric non-intrusive assessment of audiovisual media streaming quality, Recommendation ITU-T P.1201, 2012

[NPL 4] Parametric bitstream-based quality assessment of progressive download and adaptive audiovisual streaming services over reliable transport, Recommendation ITU-T P.1203, 2017

[NPL 5] I. Sodagar, "The MPEG-DASH Standard for Multimedia Streaming Over the Internet," in IEEE MultiMedia, vol. 18, pp. 62-67, 2011.

[NPL 6] Jean Le Feuvre, Cyril Concolato, "Tiled-based Adaptive Streaming using MPEG-DASH," MMSys '16 Proceedings of the 7th International Conference on Multimedia Systems, Article No. 41

SUMMARY OF THE INVENTION

Technical Problem

In order to provide VR video with appropriate quality, it is necessary to properly design the quality of video before distribution, which requires a method for estimating the quality of VR video. However, there is no objective quality assessment technique for VR video.

In the tile-based distribution of VR video, the parameters that represent the quality of the video can be changed for each tile, so that it would be necessary to estimate the quality using the parameters that represent the quality of the video for each of the tiles, unlike the conventional 2D video quality estimation.

For example, in the tile-based distribution, a high-quality video is displayed when the user is viewing only in the same direction without turning. On the other hand, when the direction of viewing a tile-based VR video is changed, the user views a low-quality video before the tile in the new viewing direction is switched from the low-quality tile to a high-quality tile, who thus may perceive deterioration of image quality. In this way, the quality of the high-quality tiles displayed when the line of sight does not move and the quality of the low-quality tiles viewed when the line of sight moves differ in the contribution rate to the quality actually experienced by the user.

For the conventional quality assessment of 2D video, it is not necessary to consider the quality deterioration due to the movement of the line of sight. However, for the quality assessment of tile-based VR video, it is necessary to consider the quality of each of the high-quality tiles and low-quality tiles to assess.

In view of the foregoing, an object of the present invention is to estimate the quality experienced by a user when viewing a tile-based VR video.

Means for Solving the Problem

A video quality estimation device according to one embodiment of the present invention is a video quality estimation device for estimating a quality experienced by a user in a tile-based video distribution service in which a video is divided into tiles and distributed, and includes: a video quality parameter extraction unit that extracts a first parameter representing a quality of a first tile and a second parameter representing qualities of one or more second tiles, from a received tile-based video; and a video quality estimation unit that estimates a quality of the tile-based video by using the first parameter and the second parameter.

Further, a video quality estimation method according to one embodiment of the present invention is a video quality estimation method implemented by a video quality estimation device for estimating a quality experienced by a user in a tile-based video distribution service in which a video is divided into tiles and distributed, and includes the steps of: extracting a first parameter representing a quality of a first tile and a second parameter representing qualities of one or more second tiles, from a received tile-based video; and estimating a quality of the tile-based video by using the first parameter and the second parameter.

Further, a program according to one embodiment of the present invention causes a computer to function as the units of the above-described device.

Effects of the Invention

According to the present invention, it is possible to estimate the quality experienced by the user when viewing the tile-based VR video.

DESCRIPTION OF EMBODIMENTS

Hereinafter, embodiments of the present invention will be described with reference to the drawings.

In an embodiment of the present invention, a technique will be described that estimates a quality experienced by a user in a tile-based video distribution service in which a video is divided into tiles and distributed.

Figure 1:
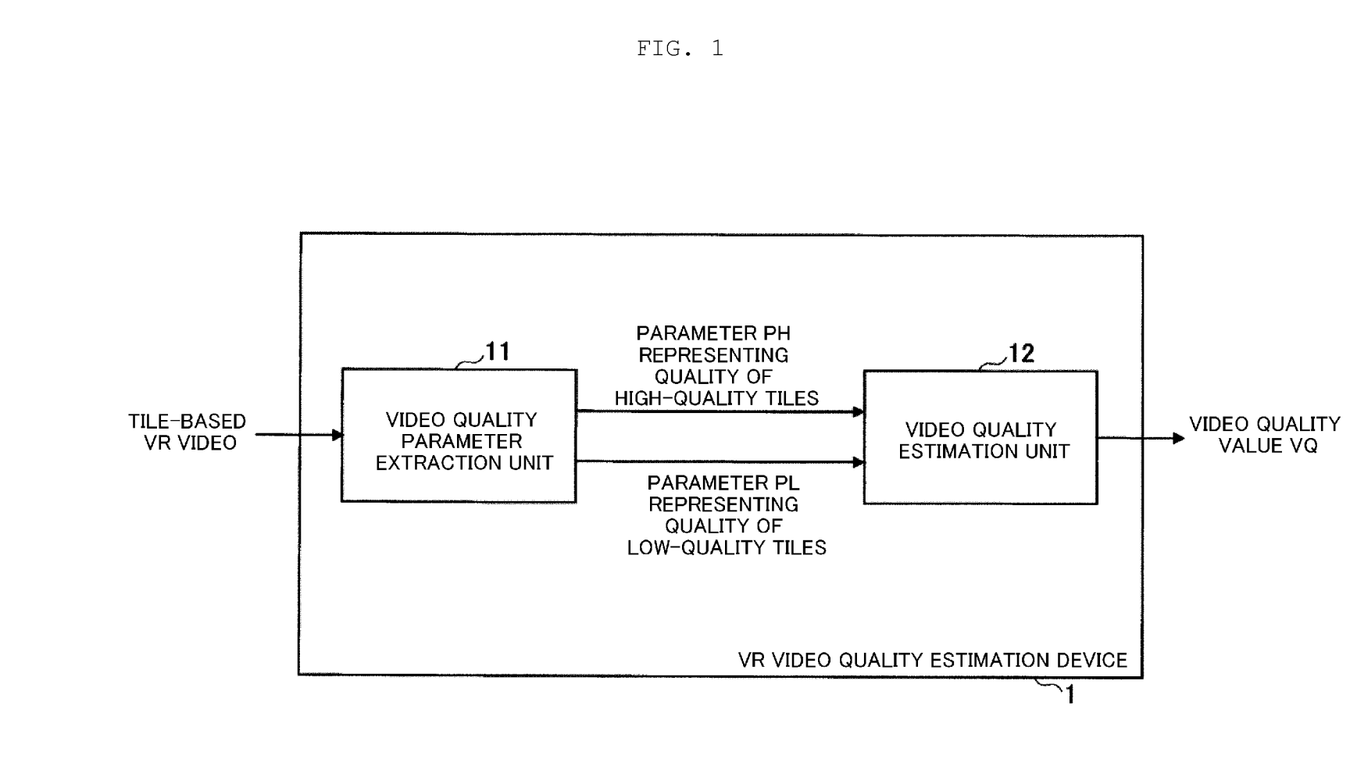
FIG. 1 is a configuration diagram of a VR video quality estimation device according to an embodiment of the present invention.

FIG. 1 illustrates a configuration of a VR video quality estimation device 1 according to the embodiment of the present invention. The VR video quality estimation device 1 is a device that aims to estimate the quality of any tile-based VR video and uses a parameter PH representing a video quality of high-quality tiles and a parameter PL representing a video quality of low-quality tiles to estimate the quality of the video. The VR video quality estimation device 1 uses input of the parameter PH and the parameter PL to estimate the quality of the VR video based on a model formula for formulating subjective assessment characteristics.

The VR video quality estimation device 1 illustrated in FIG. 1 includes a video quality parameter extraction unit 11 and a video quality estimation unit 12.

The video quality parameter extraction unit 11 uses input of the received tile-based VR video to extract from the tile-based VR video the parameters PH and PL which represent the video qualities of high-quality tiles and low-quality tiles set for quality assessment, respectively. Then, the video quality parameter extraction unit 11 outputs the parameters PH and PL of the high-quality tile and the low-quality tile to the video quality estimation unit 12.

The parameter representing the video quality is a parameter used to encode the tile-based VR video, and refers to at least one of a resolution, a frame rate, a bit rate, and a quantization parameter (QP) for each of the high-quality tiles and the low-quality tiles of the tile-based VR video. In other words, the parameter representing the video quality may be all the above information or may be some of the information.

Further, the low-quality tiles herein may be replaced with one tile covering the entire VR video, or a low-quality tile herein may be one of a plurality of divided tiles as with the high-quality tiles. In a case where a plurality of divided low-quality tiles are received and a partial area is indicated by means of a group of the low-quality tiles, the area can be treated as one tile. In the following, for the sake of brief explanation, a case where there is one low-quality tile is described.

The video quality estimation unit 12 uses input of the parameters PH and PL of high-quality tiles and low-quality tile to estimate and output the quality of the tile-based VR video (video quality value). The video quality estimation unit 12 has a model formula representing the relationship between parameters PH and PL of high-quality tiles and low-quality tile and a video quality value. The video quality estimation unit 12 inputs the parameters PH and PL of high-quality tiles and low-quality tile into the model formula to estimate the tile-based VR video quality value.

The model formula used by the video quality estimation unit 12 will be described using a QP as an example of a parameter representing a video quality. The QP is a parameter related to video coding, and the smaller the QP value, the finer the video can be expressed.

Figure 2:
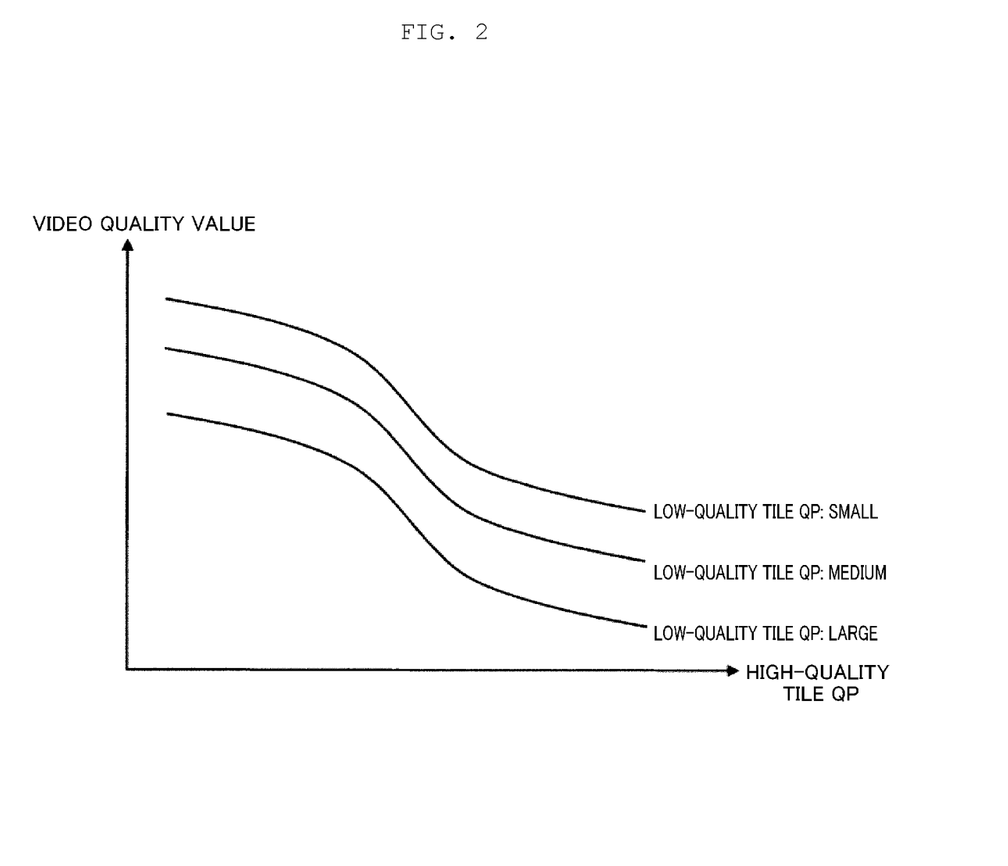
FIG. 2 illustrates an example of the relationship between a quantization parameter (QP) and a video quality value.

A relationship of quality values of videos having different QPs will be described with reference to FIG. 2. FIG. 2 illustrates the relationship between the QPs of high-quality tile and low-quality tile and the video quality value in a tile-based VR video. In FIG. 2, the horizontal axis represents the QP of high-quality tiles, the vertical axis represents the video quality value, and lines for different QPs of low-quality tiles are illustrated. For a constant QP of low-quality tiles, the quality of the tile-based VR video deteriorates as the QP of high-quality tiles increases. Specifically, when the line of sight does not move, the user generally views the high-quality tiles, so that the user perceives the noise and blurring of the VR video that occurs as the QP of high-quality tiles increases, resulting in a reduced video quality value. Here, the video quality value represents the quality value of a tile-based VR video obtained from the subjective quality assessment method.

On the other hand, even for a same QP of high-quality tiles, the video quality value differs depending on the QP of low-quality tiles, and the larger the QP of the low-quality tiles, the smaller the video quality value. Specifically, when the user moves the line of sight, the user views the low-quality tiles instead of any high-quality tiles. At that time, by viewing the low-quality tiles, the user perceives the deterioration of the video quality, resulting in a reduced video quality value.

As described above, the video quality estimation unit 12 has a model formula that expresses the characteristics that the video quality value decreases as the QP of high-quality tiles increases, and the video quality value decreases as the QP of low-quality tiles increases. As methods of obtaining a video quality value VQ experienced when viewing a tile-based VR video based on the model formula, there are (1) a method using the quality of low-quality tiles and (2) a method using an image quality difference between the high-quality tile and the low-quality tile.

Figure 3:
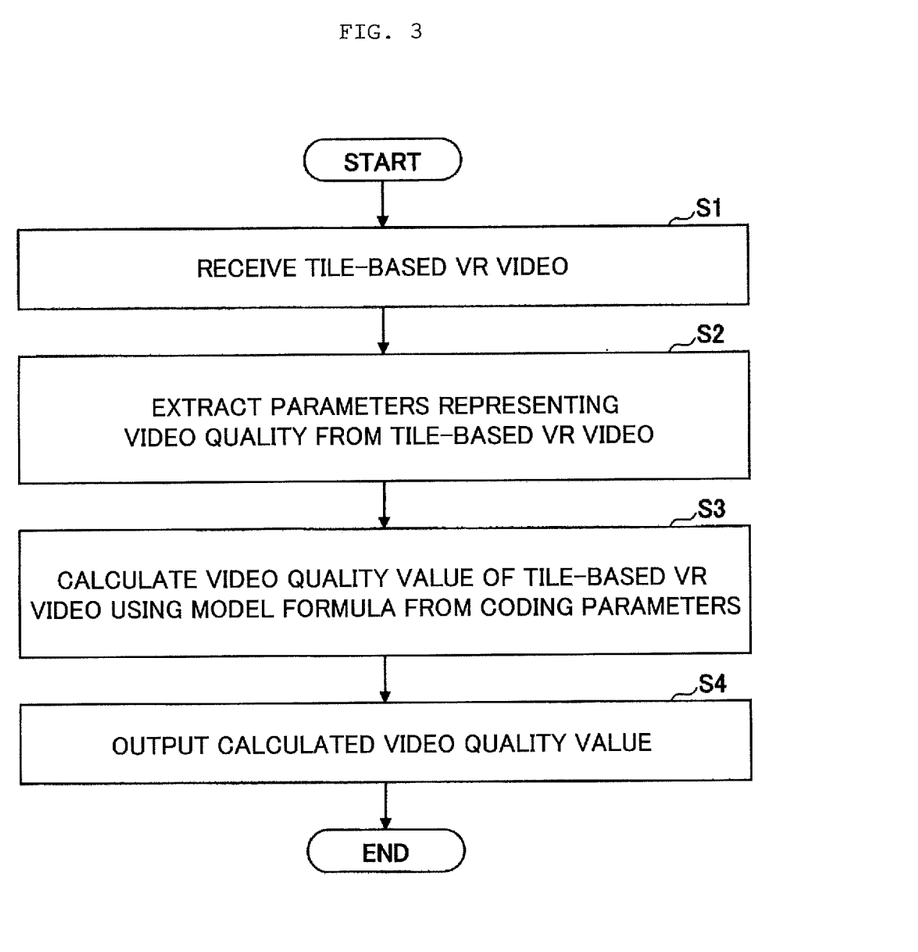
FIG. 3 is a flowchart of a video quality estimation method according to the embodiment of the present invention.

The processing procedure executed by the VR video quality estimation device 1 will be described for each of the methods. FIG. 3 is a flowchart for explaining an example of a video quality estimation method executed by the VR video quality estimation device.

In step S1, a tile-based VR video is input to the video quality parameter extraction unit 11.

In the tile-based VR video, the entire VR video is divided into tiles, and the image quality differs for each tile. Here, it is assumed that the tiles in the viewing direction of the user are high-quality tiles, and the other tiles are low-quality tiles.

In step S2, the video quality parameter extraction unit 11 extracts a parameter representing the quality of the input tile-based VR video.

In a case where the tile-based VR video is composed of high-quality tiles and low-quality tiles, the video quality parameter extraction unit 11 extracts the parameters PH and PL representing the video qualities of high-quality tiles and low-quality tiles.

In step S3, the video quality estimation unit 12 calculates a video quality value based on the quality assessment model formula.

Assuming that the parameter representing the video quality is QP, as explained with reference to FIG. 2, for a constant QP of low-quality tiles, the quality of the tile-based VR video deteriorates as the QP of high-quality tiles increases. Therefore, a quality value VQH of high-quality tiles is estimated based on the characteristics that the quality decreases as a QPH, which is the QP of high-quality tiles, increases (e.g., exponential function, reciprocal logistic function, etc.). For example, quality estimation is performed based on the following equation.

[Formula 1]
$$VQH = a - b * \exp(c * QPH) \quad (1)$$

Note that the above Equation (1) may be replaced with any of the following model formulae, or another equation may be used.

[Formula 2]
$$VQH = \frac{a}{1 + b * \exp\left(\frac{-c}{QPH}\right)} \quad (2)$$

[Formula 3]
$$VQH = a + b * \exp\left(\frac{c}{QPH}\right) \quad (3)$$

[Formula 4]
$$VQH = a + \frac{1 - a}{1 + \left(\frac{1}{QPH * b}\right)^c} \quad (4)$$

In the above Equations (1) to (4), the coefficients a to c are predetermined, but the coefficients may be numbers determined according to a resolution, a frame rate, a bit rate, and the like.

For example, a and b in Equation (4) can be calculated as follows using a resolution and a frame rate.

[Formula 5]
$$a = \frac{4(1 - \exp(-v_1 fr)) * rs}{v_2 + rs} + 1 \quad (5)$$
$$b = \frac{v_3 rs + v_4 \log_{10}(v_6 fr + 1)}{1 - e^{-v_5 rs}}$$

Here, v1 to v6 are coefficients, rs indicates the resolution of the VR video, and fr indicates the frame rate of the VR video.

Further, as explained with reference to FIG. 2, for a constant QP of high-quality tile, the quality of the tile-based VR video deteriorates as the QP of low-quality tiles increases. Therefore, a quality value VQL of low-quality tiles is estimated based on the characteristics that the quality decreases as a QPL, which is the QP of low-quality tiles, increases (e.g., exponential function, reciprocal logistic function, etc.), as with the high-quality tiles. For example, quality estimation is performed based on the following equation.

[Formula 6]
$$VQL = a - b * \exp(c * QPL) \quad (6)$$

The above Equation (6) can be replaced with another equation as in the case of the quality estimation of high-quality tiles.

(1) In the case of the method of using the quality of low-quality tiles, the video quality estimation unit 12 uses the quality value VQH of high-quality tiles and the quality value VQL of low-quality tiles to estimate a video quality value VQ based on the following equation.

[Formula 7]
$$VQ = VQH + VQL \quad (7)$$

(2) In the case of the method using an image quality difference between the high-quality tile and the low-quality tile, the video quality estimation unit 12 uses the quality value VQH of high-quality tiles and a quality deterioration value VQD of low-quality tiles to estimate a video quality value VQ based on the following equation.

[Formula 8]
$$VQ = VQH - VQD \quad (8)$$

In the above Equation (8), the VQH is estimated by any one of Equations (1) to (4) or another equation. The VQD is estimated based on the following equation using the QP (QPH) of high-quality tiles and the QP (QPL) of low-quality tiles.

[Formula 9]
$$VQD = a + \left(b * \exp\left(\frac{c}{QPH}\right) - d * \exp\left(\frac{f}{QPL}\right)\right) \quad (9)$$

Here, a to c are predetermined coefficients.

Note that Equation (9) may be replaced with the following model formula, or another equation may be used.

[Formula 10]

$$VQD = \frac{a}{1 + b * \exp(-c * (QPH - QPL))} \quad (10)$$

Here, a to f are predetermined coefficients.

In the above equations, the coefficients are predetermined, but the coefficients may be numbers determined according to a resolution, a frame rate, a bit rate, and the like.

In step S4, the video quality estimation unit 12 outputs the calculated video quality value VQ.

In the above embodiment, a VQ is estimated using a QP. The estimation of VQ is not limited to the estimation using the QP, and it is also possible to estimate using quality factors of resolution, frame rate, and bit rate, which are parameters indicating the quality of video.

For example, by using a resolution and a frame rate in addition to the QP, the VQ is estimated using a function that represents a monotonically increasing relationship of video quality (e.g., linear function, exponential function, logistic function, etc.). For example, using either the resolution or the frame rate alone, the VQH is expressed by the following equation.

[Formula 11]

$$VQH = a + b * \log_{10}(c * RSH) \quad (11)$$

[Formula 12]

$$VQH = a + b * \log_{10}(c * FRH) \quad (12)$$

Further, for example, in a case where the QP, the resolution, and the frame rate are used at the same time, the VQH is expressed by the following equation.

[Formula 13]

$$VQH = a - b * \exp(c * QPH) + d * \log_{10}(e * RSH) + f * \log_{10}\left(g * \frac{RSH}{QPH}\right) + h * \log_{10}(i * FRH) \quad (13)$$

The VQL can be expressed using an RSL and an FRL in the same way.

Here, a to i indicate predetermined coefficients, RSH and RSL indicate the resolutions of high-quality tiles and low-quality tiles, respectively, and FRH and FRL indicate the frame rates of high-quality tiles and low-quality tiles, respectively.

Further, by using a bit rate instead of the QP, the VQH can be estimated using a function that represents a monotonically increasing relationship of video quality (e.g., linear function, exponential function, logistic function, etc.). For example, it is expressed by the following equation.

[Formula 14]

$$VQH = a + b * \log_{10}(c * BRH) \quad (14)$$

The VQL can be expressed using a BRL in the same way.

Here, a to c indicate predetermined coefficients, and BRH and BRL indicate the bit rates of high-quality tiles and low-quality tiles, respectively.

Similarly, for (2) the method using an image quality difference between the high-quality tile and the low-quality tile, the VQD can also be expressed by using the resolution, the frame rate, and the bit rate.

Note that the equations used for the quality estimation are merely examples, and other equations are also within the scope of the present invention.

Figure 4:
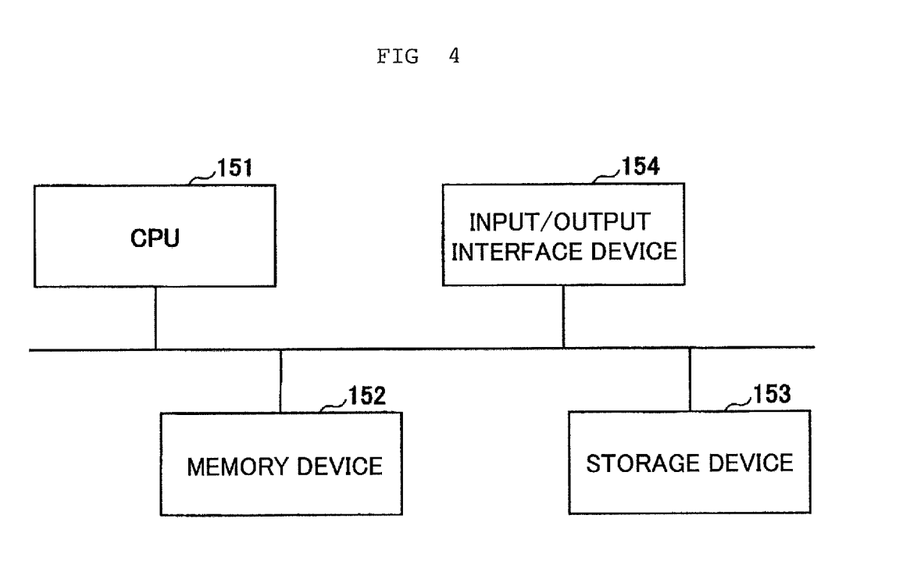
FIG. 4 is a diagram illustrating a hardware configuration example of the VR video quality estimation device according to the embodiment of the present invention.

FIG. 4 illustrates a hardware configuration example of the VR video quality estimation device 1 according to the embodiment of the present invention. The VR video quality estimation device 1 may be a computer configured to include a processor such as a CPU (Central Processing Unit) 151, a memory device 152 such as RAM (Random Access Memory) and ROM (Read Only Memory), and a storage device 153 such as a hard disk. For example, the functions and processing of the VR video quality estimation device 1 are implemented by the CPU 151 executing data or programs stored in the storage device 153 or the memory device 152. Further, the information required for the VR video quality estimation device 1 may be input from an input/output interface device 154, and results obtained by the VR video quality estimation device 1 may be output from the input/output interface device 154.

For convenience of explanation, the VR video quality estimation device 1 according to the embodiment of the present invention is described using a functional block diagram. However, the VR video quality estimation device 1 according to an embodiment of the present invention may be realized by hardware, software, or a combination thereof. For example, an embodiment of the present invention may be implemented by a program for causing a computer to function as the VR video quality estimation device 1 according to the embodiment of the present invention, a program for causing a computer to execute the procedures of the method according to the embodiment of the present invention, or the like. Further, the functional units may be used in combination as necessary. Further, the method according to the embodiment of the present invention may be performed in a different order from the order described in the embodiment.

As described above, in the tile-based VR video, the present invention can use parameters representing the video qualities of the high-quality tiles and the low-quality tiles to determine the qualities of the high-quality tiles and the low-quality tiles or an image quality difference between the high-quality tile and the low-quality tile, and can use a model that takes into consideration the quality deterioration due to the movement of line of sight to estimate a quality experienced by a user when viewing a tile-based VR video.

The techniques that can perform quality estimation from coding parameters for a tile-based VR video has been described above. However, the present invention is not limited to the above-described embodiment, and various changes and applications are possible within the scope of the claims.

REFERENCE SIGNS LIST

1 VR video quality estimation device
11 Video quality parameter extraction unit
12 Video quality estimation unit

The invention claimed is:

1. A device for estimating a quality of user experience of a tile-based video distribution service, wherein in the tile-based video distribution service, a video is divided into tiles and the tiles of the video are distributed, the device comprising:
   processing circuitry configured to:
   extract, from a received tile-based video, a first parameter relating to a first quality of a first tile and a second parameter relating to a second quality for one or more second tiles, the first quality being higher than the second quality; and
   estimate the quality of the user experience for the tile-based video by using the first parameter and the second parameter, wherein the quality of the user experience of the tile-based video is estimated as deteriorated in a case where the second quality increases upon occurrence of a condition in which the first quality is constant and where a value of the second quality is estimated based on a characteristic that the quality of the user experience of the tile-based video decreases as the second quality increases.

2. The device according to claim 1, wherein the first tile for which the first parameter is greater than the second parameter is set as a high-quality tile of which a quality, as the first quality, is higher than the second quality for the one or more second tiles, and the one or more second tiles are set as one or more low-quality tiles for which a quality, as the second quality, is lower than that of the high-quality tile, and
   the processing circuitry is configured to:
   estimate the first quality of the high-quality tile by using the first parameter relating to the first quality of the high-quality tile,
   estimate the second quality for the one or more low-quality tiles by using the second parameter relating to the second quality for the one or more low-quality tiles, and
   estimate the quality of the user experience of the tile-based video, based on the first quality of the high-quality tile and the second quality for the one or more low-quality tiles.

3. The device according to claim 1, wherein the first tile for which the first parameter is greater than the second parameter is set as a high-quality tile of which a quality, as the first quality, is higher than the second quality for the one or more second tiles, and the one or more second tiles are set as one or more low-quality tiles for which a quality, as the second quality, is lower than that of the high-quality tile, and
   the processing circuitry is configured to:
   estimate the first quality of the high-quality tile by using the first parameter relating to the first quality of the high-quality tile,
   estimate a difference in image quality among the high-quality tile and the one or more low-quality tiles, by using the first parameter relating to the first quality of the high-quality tile and the second parameter relating to the second quality for the one or more low-quality tiles, and
   estimate the quality of the user experience of the tile-based video, based on the estimated first quality of the high-quality tile and the estimated difference in the image quality.

4. The device according to claim 1, wherein each of the first parameter and the second parameter relates to at least one among a resolution, a frame rate, a bit rate, and a quantization parameter.

5. A method for execution by a device for estimating a quality of user experience of a tile-based video distribution service, wherein in the tile-based video distribution service, a video is divided into tiles and the tiles are distributed, the method comprising:
   extracting, from a received tile-based video, a first parameter relating to a first quality of a first tile and a second parameter relating to a second quality for one or more second tiles, the first quality being higher than the second quality; and
   estimating the quality of the user experience for the tile-based video by using the first parameter and the second parameter, wherein the quality of the user experience of the tile-based video is estimated as deteriorated in a case where the second quality increases upon occurrence of a condition in which the first quality is constant and where a value of the second quality is estimated based on a characteristic that the quality of the user experience of the tile-based video decreases as the second quality increases.

6. A non-transitory computer readable medium storing a program that causes a computer to execute the method according to claim 5.

* * * * *